Jan. 9, 1934.   B. NOYES, JR   1,942,517
THERMOMETER
Filed Jan. 10, 1933
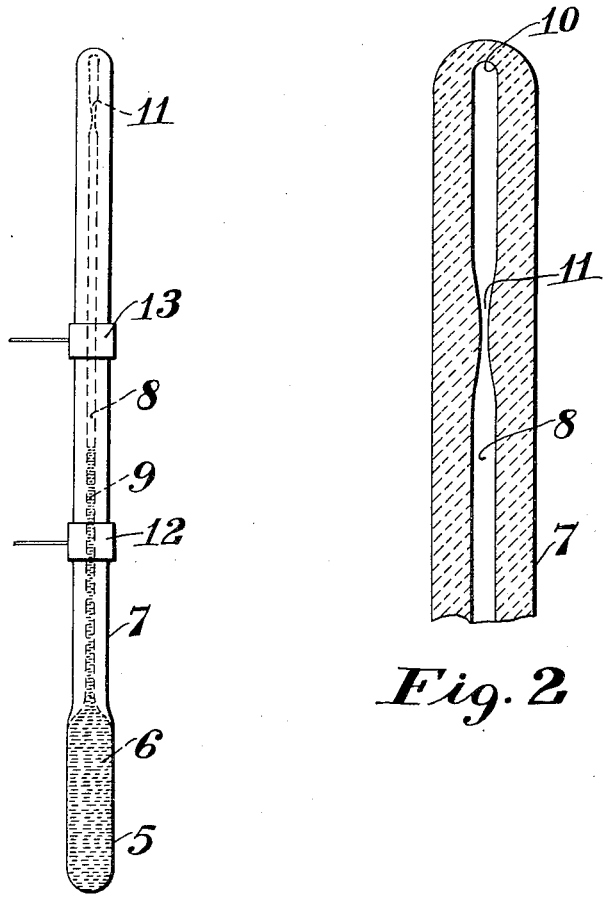
INVENTOR
Bradford Noyes Jr.
BY
ATTORNEY Patented Jan. 9, 1934

1,942,517

UNITED STATES PATENT OFFICE 1,942,517

THERMOMETER

Bradford Noyes, Jr., Rochester, N. Y., assignor to Taylor Instrument Companies, Rochester, N. Y., a corporation of New York Application January 10, 1933. Serial No. 650,967

3 Claims. (Cl. 73—52)

This invention relates to thermometers and thermostats.

In a thermometer wherein the expanding medium is a heavy liquid, such as mercury, and wherein the bore is of relatively large diameter and the bore above the mercury is evacuated, the glass at the closed end of the bore is subjected to severe strains from the impact of the mercury whenever the thermometer is sharply jarred while in an inverted position. Such strains may result in splitting or cracking the glass at the closed end of the thermometer tube. This splitting or cracking of the glass is one important cause of breakage in thermometers, especially in those having relatively large bores.

In accordance with the present invention, means are provided within the thermometer for preventing the cracking of the glass at the closed end of the thermometer tube bore.

For a clearer understanding of the invention reference is made to the drawing in which Fig. 1 represents a front view of a thermometer incorporating the present invention; and Fig. 2 is a vertical sectional view of a fragment of the thermometer of Fig. 1, greatly enlarged.

In Fig. 1, 5 designates a glass thermometer tube which terminates in a bulb 6 containing mercury or other similar heavy expanding medium. The thermometer tube is provided with a well-known bore 8 of relatively large diameter, in which the mercury or other filling medium in the bulb expands or contracts in response to temperature changes.

The space in the bore 8, above the column of mercury 9, is evacuated with the result that if, for any reason, the thermometer is inverted and subjected to shock while in this position the mercury striking the glass at the closed end 10 of the bore will cause a crack or split to develop at that point.

In accordance with the present invention, it is proposed to provide retarding means within the bore of the thermometer for preventing a rapid movement of the mercury against the closed end of the bore due to a sudden jar while the thermometer is in an inverted position so that the end of the bore is protected from strains. A convenient way of effecting this retarding action is to form a constriction or reduction in the diameter of the bore adjacent the upper end of the thermometer tube, as indicated at 11.

While the present invention is adapted for use in various types of thermometers, it is particularly useful in electric contact thermometers, and for this reason the thermometer is illustrated as provided with a lower electrical contact 12 and an upper electrical contact 13, which contacts include portions extending through the glass walls of the thermometer tube into the bore 8, to make electrical contact with the rising mercury column 9. These contacts may be attached to the thermometer in any well-known manner such as that disclosed in the patent to Norwood 986,023, granted March 7, 1911.

While I have illustrated the preferred form of the invention, it should be understood that the invention may take various forms all included within the scope of the appended claims.

I claim:

1. In a thermometer, a glass thermometer tube provided with a bore closed at its upper end, a bulb communicating with said bore, a heavy expansible liquid in said bulb, and means within the thermometer bore, at a point near the closed end of said bore above the normal limit of exposure of the liquid, for retarding the movement of the liquid and thereby preventing the transmission of fracturing shocks to the glass on the inversion of the tube.

2. In a thermometer, a glass thermometer tube provided with a bore closed at its upper end, a bulb communicating with said bore, a heavy liquid in said bulb, and means within the thermometer bore, at a point near the closed end of said bore above the normal limit of exposure of the liquid, for reducing the cross sectional area of the bore and thereby preventing the transmission of fracturing shocks to the glass from the liquid upon the inversion of the tube.

3. In a thermometer, a glass thermometer tube provided with a bore closed at its upper end, a bulb communicating with said bore, and a heavy liquid in said bulb, the glass of said tube near the closed end of said bore and above the normal limit of exposure of the liquid, being extended into the bore to reduce the size thereof, thereby preventing the transmission of fracturing shocks to the glass by the liquid upon the inversion of the tube.

BRADFORD NOYES, JR.